March 27, 1928.  1,663,898

F. C. BITZENBURGER

YIELDABLE BACK SUPPORT FOR SEATS

Filed Sept. 18, 1924   2 Sheets-Sheet 1

Inventor
FRANK C. BITZENBURGER.
By A. B. Bowman
Attorney

March 27, 1928. 1,663,898
F. C. BITZENBURGER
YIELDABLE BACK SUPPORT FOR SEATS
Filed Sept. 18, 1924 2 Sheets-Sheet 2
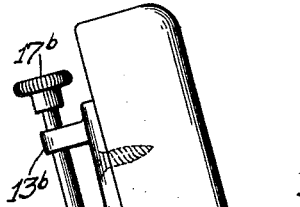
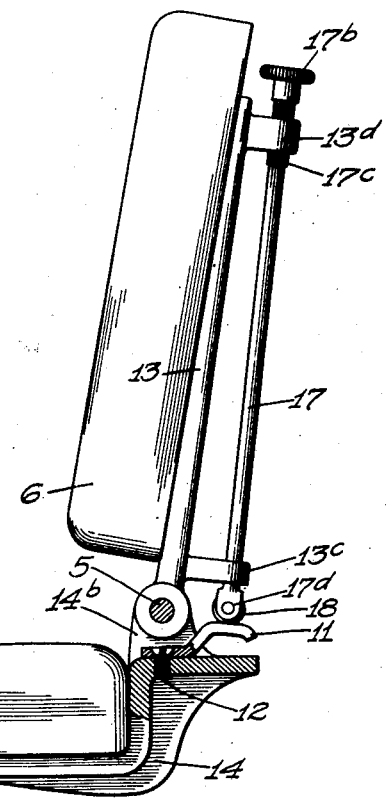
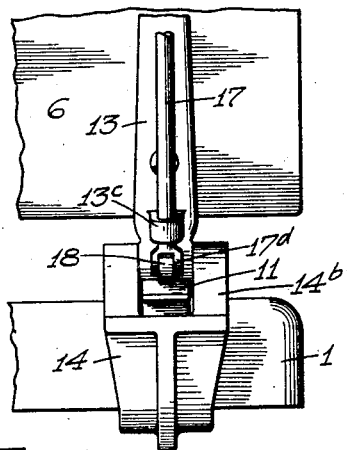
Inventor
FRANK C. BITZENBURGER.
By A. B. Bowman
Attorney Patented Mar. 27, 1928.

1,663,898

UNITED STATES PATENT OFFICE.

FRANK C. BITZENBURGER, OF LOS ANGELES, CALIFORNIA.

YIELDABLE BACK SUPPORT FOR SEATS.

Application filed September 18, 1924. Serial No. 738,439.

My invention relates to yieldable back supports for seats, more particularly for automobile jump seats, and the like and the objects of my invention are: first, to provide a yieldable back supporting means in connection with seats such as automobile jump seats or any seats in which the backs are movable relatively to the seat member; second, to provide a means of this class whereby the back member of a seat of this class is pivotally mounted at its lower side at the upper portion of the back side of the seat member and whereby the back member may be variously tilted about its pivotal support in a back supporting position; third, to provide a seat structure of this class, having a pivotally supported back member and a spring means contiguous to its pivotal support for yieldably supporting the back member in a back supporting position; fourth, to provide an adjustable spring means for yieldably supporting the back member of a seat structure of this class and a novel means for variously adjusting the movement of the back member relatively to the seat member; fifth, to provide as a whole a novelly constructed back supporting means for a seat structure of this class, and sixth, to provide a yieldable back supporting means for seats of this class which is particularly simple and economical of construction, durable, and which will not readily deteriorate or get out of order.

Figure 1:
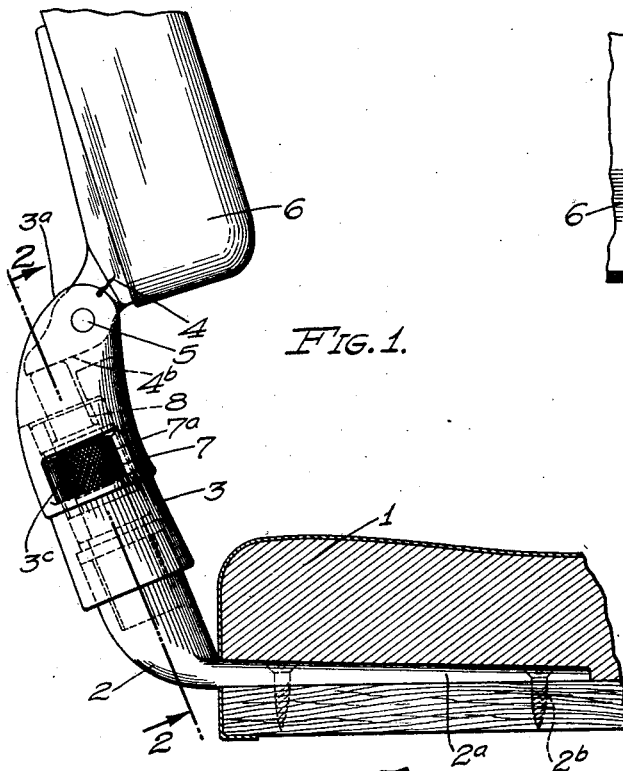
Figure 2:
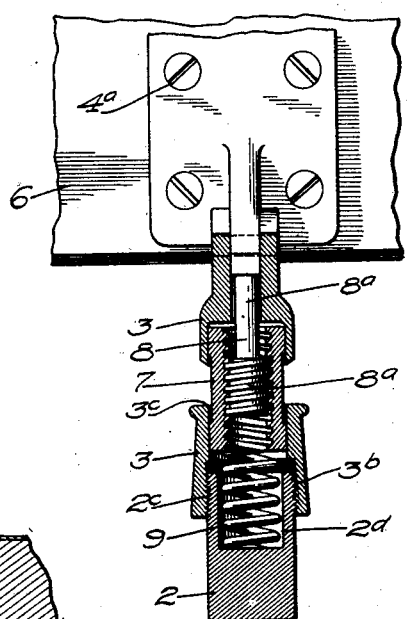
Figure 3:
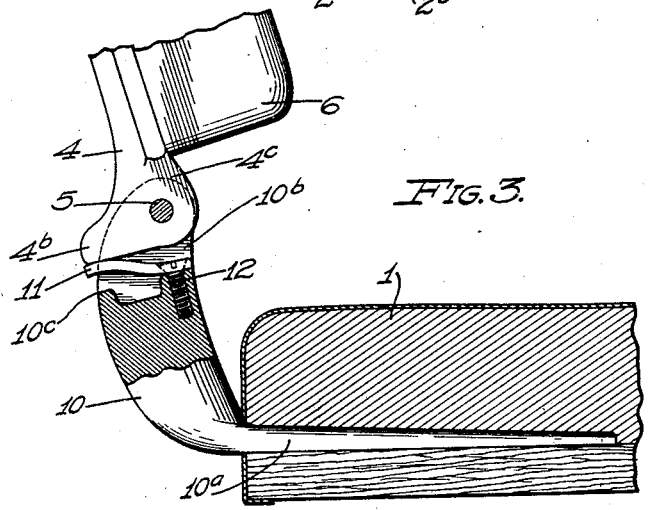

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application in which:

Figure 1 is a side elevational view of my back supporting means supported on a seat member, shown fragmentarily and in section, and also showing the back member supported by the supporting means, fragmentarily; Fig. 2 is a partial sectional and partial elevational view thereof, with the section taken through 2—2 of Fig. 1; Fig. 3 is a fragmentary sectional elevational view of a slightly modified form of construction of my back supporting means supported at the rear portion of a seat member, shown fragmentarily and in section, and showing also a portion of the supporting means partly broken away and in section to facilitate the illustration. Fig. 4 is another side elevational view of another slightly modified form of construction of my back member supporting means, supported at the rear portion of the seat member shown fragmentarily, and showing certain parts and portions of the supporting means broken away and in section to facilitate the illustration; Fig. 5 is a side elevational view of another slightly modified form of construction of my back member supporting means for seats of this class showing the seat member fragmentarily and parts and portions of the supporting means broken away and in section to facilitate the illustration, and Fig. 6 is a fragmentary rear elevational view thereof.

Like characters of reference refer to similar parts and portions throughout the several views of the drawings.

The seat member 1, supporting bracket 2, supporting member 3, back member securing bracket 4, pin 5, back member 6, adjusting member 7, adjustable back positioning member 8, and the compression spring 9, constitute the principal parts and portions of my back supporting means for seats in its preferred form of construction.

The seat member 1 of automobile jump seats, positioned in the tonneau of automobiles, is usually so mounted as to be folded into the back side of the front seat of the automobile or into the floor of the same. In the preferred form of construction, as shown in Figs. 1 and 2, the supporting bracket 2 is provided with a plate portion 2ª which is secured to the top side of the board or other member supporting the upholstering of the seat member 1 by means of screws 2ᵇ. The portion of the bracket 2 extending outwardly beyond the rear of the seat member is considerably enlarged and extends upwardly at an angle therefrom. The upper enlarged end of the bracket 2 is externally threaded, as indicated by 2ᶜ, upon which end is screwably secured the hollow supporting member 3, which is provided at its upper end with a bifurcated portion 3ª in which is pivotally mounted, by means of a pin 5, the back member securing bracket 4, which is secured, preferably by means of screws 4ᵃ, to the back side of the back member 6. The pivotal connection between the supporting member 3 and the bracket 4 permits the back member 6 to be folded downwardly toward the seat member 1.

Within the supporting member 3, intermediate the internally threaded end 3ᵇ and the bifurcated end 3ᵃ, is rotatably mounted an adjusting member 7 which is slightly reduced diametrically intermediate its ends and knurled, as indicated by 7ᵃ in Fig. 1. This adjusting member 7 is in the form of a sleeve and is internally threaded throughout its length. Within the internally threaded portion of the adjusting member or sleeve 7 is screwably positioned the correspondingly threaded end 8ᵃ at the normally lower end of the back positioning member 8. This back positioning member 8 is provided at its upper end with a reduced shank 8ᵃ flattened on its opposite side to a width slightly less than the space between the outwardly extending legs at the bifurcated portion 3ᵃ of the supporting member 3. This reduced flattened shank 8ᵃ is reciprocally mounted in the space of the bifurcated portion and is prevented from rotating relatively thereto by reason of the flattened shank 8ᵃ, thus permitting the adjusting member 7 to be rotated relatively to the supporting member 3 and the member 8 for adjusting the latter member longitudinally. The sides of the supporting member 3 are provided with cutaway portions 3ᶜ so that the member 7 may be readily accessible for rotating the same and adjusting the position of the member 8. At the upper end of the bracket 2 is provided a recess 2ᵈ in which is positioned a compression coil spring 9 which supports at its upper end the lower end of the adjusting member 7. The lower end of the bracket 4 securing the back member 6 is provided with a downwardly and backwardly extending lug 4ᵇ which is adapted to engage the upper end of the back positioning member 8 for yieldably supporting the back member in an upright position.

It will be noted that the tension or compression of the spring 9 is not varied, but the position or angularity of the back member is varied by the adjustment of the member 7. It will also be noted that the lower end of the member 7 engages the upper end of the member 2 forming a stop when the spring 9 is compressed sufficiently.

In the modified form of construction, shown in Fig. 3, the bracket and supporting member are combined into a single member 10 which is provided with a plate 10ᵃ secured to the seat member 1 in a similar manner and which is provided at its upper end with a bifurcated portion 10ᵇ in which is pivotally mounted the downwardly extending lug 4ᶜ of the back securing member 4 by means of the pin 5. At the lower end of the bifurcated portion 10ᵇ of the bracket 10 and at the front side thereof is secured, by means of a screw 12, the forward end of the offset leaf spring 11. The outer end of the spring 11 which extends through the bifurcated portion is adapted to be engaged by the backwardly extending lug 4ᵇ of the bracket 4, as described in connection with the preferred construction, for yieldably supporting the back member 6 in upright or useable position. The bracket 10 is provided at the lower rear portion of the bifurcated portion with a stop 10ᶜ for limiting the backwardly tiltable position of the back member.

In the other modified form of construction, shown in Fig. 4, the back securing member, indicated by 13, is also pivotally supported at its lower end, by means of a pin 5, at the upper end of the supporting bracket 4 secured to the under side of the seat member 1. In this form of construction, however, the spring, indicated by 15, is positioned at the lower portion of the bracket 13 and is mounted over the member 16ᵃ of the plunger 16 which forms a stop with the end of the member 17ᵃ, said plunger 16 being yieldably positioned and reciprocally mounted at the lower end of said bracket. The upper end of the spring 15 is engaged by the lower end of the adjusting member 17, which is provided at its lower end with an enlarged externally threaded portion 17ᵃ screwably mounted at the upper end of a socket portion 13ᵃ in which the spring 15 is positioned. The member 17 is rotatably supported at its upper end in a lug 13ᵇ secured near the upper end of the bracket 13 and is also provided at its upper end with a knob 17ᶜ for rotating the same and adjusting the movement of the seat back. At the upper end of the bracket 14 is provided a backwardly extending lug 14ᵃ which is adapted to be engaged by the lower end of the plunger 16 for positioning the back member 6 relatively to the seat member.

In the other modified form of construction of my back supporting means, as shown in Figs. 5 and 6 of the drawings, the bracket member 13 is also pivotally mounted at its lower end in a bifurcated portion 14ᵇ at the upper end of the bracket 14 secured to the lower side of the seat member 1. At the bifurcated portion 14ᵇ and below the pivotal connection of the members 13 and 14 is secured, by means of a screw 12, the front end of an offset leaf spring 11. At the back side of the bracket 13 are provided a pair of lugs 13ᶜ and 13ᵈ for supporting the adjusting member 17, the upper end of the adjusting member being provided with an enlarged externally threaded portion 17ᶜ which extends into the threaded recess of the lug 13ᵈ. The upper end of the adjusting rod or member 17 in this latter form of construction is also provided with a knob 17ᶜ for rotating the same and adjusting the same longitudinally. Said member 17 is provided at its lower end with a bifurcated portion 17ᵈ in which is revolubly mounted a roller 18 which is adapted to engage the offset portion of the spring 11 for yieldably supporting the back member 6 relatively to the seat member 1. Figure 6 of the drawings shows the latter supporting means positioned at and supporting one side of the seat member and back member.

It is obvious from this construction, as illustrated in the drawings and disclosed in the foregoing specification, that there is provided a yieldable back supporting structure for seats, as aimed at and set forth in the objects of the invention, and though I have shown and described a particular construction, combination and arrangement of parts and portions and certain modifications thereof, I do not wish to be limited to this particular construction, combination and arrangement nor to the modifications but desire to include in the scope of my invention the construction, combination and arrangement substantially as set forth in the appended claims.

Having thus described my invention, what I claim as new and desire to secure by Letters Patent, is:

1. In a back supporting means, a supporting bracket, a supporting member secured to the upper end thereof, a back member securing bracket pivotally mounted at the upper end of said supporting member and provided with a backwardly extending lug, a back member secured to said back member securing bracket, an internally threaded sleeve revolubly mounted within said supporting member, and a back positioning member provided with a threaded portion at its normally lower end extending into said internally threaded sleeve and adapted to engage at its upper end the lug of said back member securing bracket.

2. In a back supporting means, a supporting bracket, a supporting member secured to the upper end thereof, a back member securing bracket pivotally mounted at the upper end of said supporting member and provided with a backwardly extending lug, a back member secured to said back member securing bracket, an internally threaded sleeve revolubly mounted within said supporting member, a back positioning member provided with a threaded portion at its normally lower end extending into said internally threaded sleeve and adapted to engage at its upper end the lug of said back member securing bracket, and a compression spring positioned between said supporting bracket and said back positioning member.

3. In a back supporting means, a supporting bracket provided with a recess in its upper end, a supporting member secured to the upper end of said supporting bracket, a back member securing bracket pivotally mounted at the upper portion of said supporting member and provided with a backwardly extending lug, a back member secured to said back member securing bracket, an internally threaded adjusting member rotatably positioned within said supporting member, and a back positioning member provided with an enlarged externally threaded portion at its lower end adapted to extend into the internally threaded portion of said adjusting member and provide at its upper end with a flattened shank adapted to extend upwardly through a space of slightly greater width than said flattened shank and engage the backwardly extending lug of said back member securing bracket.

4. In a back supporting means, a supporting bracket provided with a recess in its upper end, a supporting member secured to the upper end of said supporting bracket, a back member securing bracket pivotally mounted at the upper portion of said supporting member and provided with a backwardly extending lug, a back member secured to said back member securing bracket, an internally threaded adjusting member rotatably positioned within said supporting member, a back positioning member provided with an enlarged externally threaded portion at its lower end adapted to extend into the internally threaded portion of said adjusting member and provided at its upper end with a flattened shank adapted to extend upwardly through a space of slightly greater width than said flattened shank and engage the backwardly extending lug of said back member securing bracket, and a compression spring with its one end positioned in the recess at the upper end of said supporting member and provided at its upper end with a normally lower end of said adjusting member.

5. In a seat supporting means of the class described, a seat member, a supporting bracket secured to said seat member and extending backwardly and upwardly therefrom, a supporting member secured to the upper end of said supporting bracket and provided at its upper end with a bifurcated portion, a back member securing bracket pivotally mounted at the upper portion of the bifurcated portion of said supporting member and provided with an extended portion extending backwardly from its pivotal support between the legs of said bifurcated portion, a back member secured to said back member securing bracket, an adjusting member rotatably positioned within said supporting member and provided with internal threads, a back positioning member provided with an enlarged externally threaded portion at its lower end adapted to engage the internal threads of said adjusting member and also provided with a reduced flattened upwardly extending shank of slightly less thickness than the space between the legs of the bifurcated portion of said supporting member to prevent relative rotation between said members, said reduced flattened upwardly extending shank being adapted to be engaged by the backwardly extending portion of said back member securing bracket, said supporting member being provided with cutaway portions at its opposite sides to facilitate the rotation of said adjusting member.

6. In a seat supporting means of the class described, a seat member, a supporting bracket secured to said seat member and extending backwardly and upwardly therefrom, a supporting member secured to the upper end of said supporting bracket and provided at its upper end with a bifurcated portion, a back member securing bracket pivotally mounted at the upper portion of the bifurcated portion of said supporting member and provided with an extended portion extending backwardly from its pivotal support between the legs of said bifurcated portion, a back member secured to said back member securing bracket, an adjusting member rotatably positioned within said supporting member and provided with internal threads, a back positioning member provided with an enlarged externally threaded portion at its lower end adapted to engage the internal threads of said adjusting member and also provided with a reduced flattened upwardly extending shank of slightly less thickness than the space between the legs of the bifurcated portion of said supporting member to prevent relative rotation between said members, said reduced flattened upwardly extending shank being adapted to be engaged by the backwardly extending portion of said back member securing bracket, said supporting member being provided with cutaway portions at its opposite sides to facilitate the rotation of said adjusting member, and a compression spring positioned with its one end against the supporting bracket and with its opposite end against the lower end of said adjusting member.

7. In a back supporting means, a supporting bracket, a supporting member secured to the upper end thereof, a back member securing bracket pivotally mounted at the upper end of said supporting member and provided with an extending lug, a back member secured to said back member securing bracket, an internally threaded sleeve revolubly mounted within said supporting member and a back positioning member provided with a threaded portion at its normally lower end extending into said internally threaded sleeve and adapted to engage at its upper end the lug of said back member securing bracket.

8. In a back supporting means, a supporting bracket, a supporting member secured to the upper end thereof, a back member securing bracket pivotally mounted at the upper end of said supporting member and provided with an extending lug, a back member secured to said back member securing bracket, a threaded sleeve revolubly mounted within said supporting member and a back positioning member provided with a threaded portion at its normally lower end engaging said threaded sleeve and adapted to engage at its upper end the lug of said back member securing bracket.

9. In a back supporting means, a supporting bracket, a supporting member secured thereto, a back member securing bracket pivotally mounted in said supporting member and provided with an extending lug, a back member secured to said back member securing bracket, a threaded sleeve revolubly mounted within said supporting member and a back positioning member provided with a threaded portion at its normally lower end engaging said threaded sleeve and adapted to engage at its upper end the lug of said back member securing bracket.

In testimony whereof, I have hereunto set my hand at Los Angeles California, this 11th day of September, 1924.

FRANK C. BITZENBURGER.